United States Patent
van der Ham et al.

(10) Patent No.: US 9,851,278 B2
(45) Date of Patent: Dec. 26, 2017

(54) BEARING MONITORING APPARATUS AND METHOD

(71) Applicant: AKTIEBOLAGET SKF, Göteborg (SE)

(72) Inventors: Andreas Clemens van der Ham, Utrecht (NL); Nicolaas Simon Willem Den, Zwijndrecht (NL); Adam V. C. Reedman, Hoornaar (NL)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/037,848

(22) PCT Filed: Nov. 25, 2013

(86) PCT No.: PCT/EP2013/074589
§ 371 (c)(1),
(2) Date: May 19, 2016

(87) PCT Pub. No.: WO2015/074721
PCT Pub. Date: May 28, 2015

(65) Prior Publication Data
US 2016/0305845 A1   Oct. 20, 2016

(51) Int. Cl.
*G01B 11/16*  (2006.01)
*G01M 13/04* (2006.01)
(Continued)

(52) U.S. Cl.
CPC ........... *G01M 13/04* (2013.01); *F16C 19/522* (2013.01); *F16C 41/008* (2013.01); *G01L 1/246* (2013.01);
(Continued)

(58) Field of Classification Search
CPC .......... G01D 5/26; G01D 5/20; G01M 13/04; G01M 13/045; G01L 1/246; F16C 19/522; F16C 41/008; F16C 32/00
(Continued)

(56) References Cited

U.S. PATENT DOCUMENTS 4,196,629 A    4/1980  Philips
4,870,271 A  * 9/1989  Philips .................... F16C 19/52
                                            250/231.1
(Continued)

FOREIGN PATENT DOCUMENTS

EP       1548419 A1     6/2005
WO       98/36251 A1    8/1998
WO       2011/066926 A1 6/2011

OTHER PUBLICATIONS

Juarez, J. C., et al: "Fiber Optic Strain System for Ball Bearings," 2002 15th Optical Fiber Sensors Conference Technical Digest.

*Primary Examiner* — Lisa Caputo
*Assistant Examiner* — Octavia Hollington
(74) *Attorney, Agent, or Firm* — Bryan Peckjian; SKF USA Inc. Patent Dept.

(57) ABSTRACT

A bearing monitoring apparatus including at least one interface for receiving strain signals detected by at least one strain sensor mounted on a bearing and at least one data processing unit configured to monitor the bearing by detecting bearing defects based on the strain signals is provided. The data processing unit is configured to subject the strain signal to a high pass filtering. A limit frequency of the high pass filter is set higher than a typical ball pass frequency of the bearing to be monitored, to calculate a quantity representative of the amplitude of the envelope signal of the high-pass filtered strain signal, to compare the peak hold of the envelope signal with an envelope threshold value, to (Continued)

classify the bearing using the result of the envelope comparison and to issue at least one warning signal if the bearing is classified as defective.

18 Claims, 3 Drawing Sheets

(51) Int. Cl.
*F16C 19/52* (2006.01)
*F16C 41/00* (2006.01)
*G01L 1/24* (2006.01)
*F16C 33/58* (2006.01)

(52) U.S. Cl.
CPC ......... G01M 13/045 (2013.01); *F16C 33/586* (2013.01)

(58) Field of Classification Search
USPC .......................................................... 73/800
See application file for complete search history.

(56) References Cited

U.S. PATENT DOCUMENTS

| | | | | |
|---|---|---|---|---|
| 5,852,793 A * | 12/1998 | Board | .................... | G01H 1/003 |
| | | | | 702/183 |
| 7,716,018 B2 * | 5/2010 | Pecher | .................. | G01L 5/0019 |
| | | | | 702/190 |
| 7,843,192 B2 * | 11/2010 | Galeote | .................... | F16C 19/52 |
| | | | | 324/234 |
| 8,790,013 B2 * | 7/2014 | Reedman | ........... | G01D 5/35303 |
| | | | | 384/448 |
| 9,279,715 B2 * | 3/2016 | Hedin | .................... | G01H 1/003 |
| 9,442,026 B2 * | 9/2016 | Mol | ...................... | G01L 5/0019 |

* cited by examiner

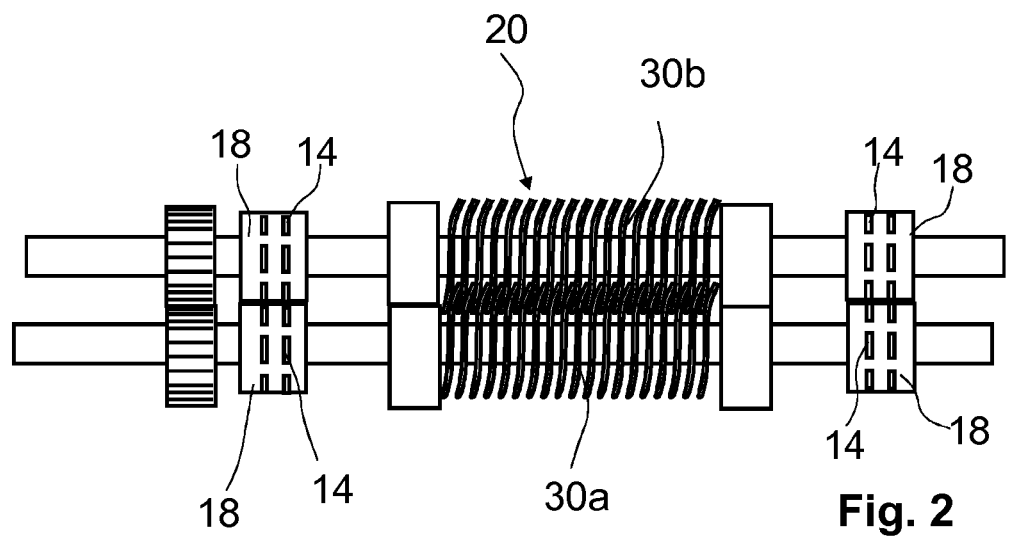
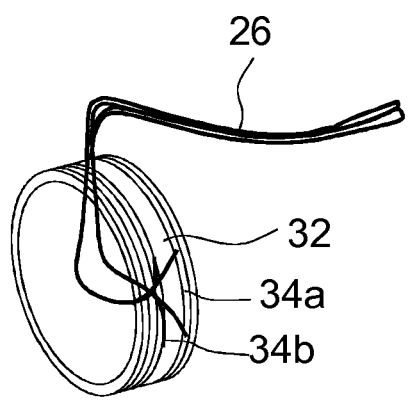
Fig. 3a
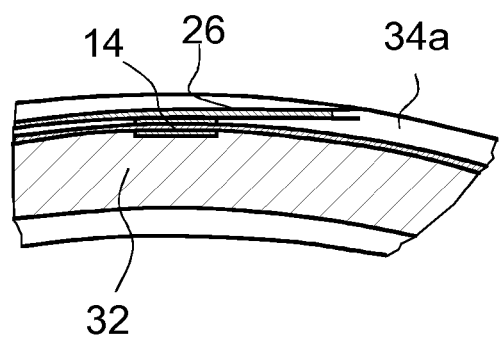
Fig. 3b

BEARING MONITORING APPARATUS AND METHOD

CROSS-REFERENCE

This application is the U.S. National Stage of International Application No. PCT/EP2013/074589 filed on Nov. 25, 2013, the content of which is herein incorporated by reference in its entirety.

FIELD OF THE INVENTION

The Invention relates to a bearing monitoring apparatus and to a bearing monitoring method employing strain signals.

BACKGROUND OF THE INVENTION

Bearing monitoring technology using vibration signals obtained by accelerometers is well known and mature technology. However, this technology is not available for some important fields of application.

One important example is subsea devices such as deep sea pumps. Commonly used condition monitoring systems are difficult to deploy in subsea conditions due to the electronic packaging requirements and the high data bandwidth. Besides that, electronic transmission over long distances, for example when running alongside power lines, is sensitive to electromagnetic interference.

Deep sea pumps used for oil and gas applications are important assets for the production of an oil rig. Monitoring of the asset is problematic as the electronics can be less reliable than the mechanical system being monitored by the electronics. Therefore, for the purpose of bearing monitoring, conventional acceleration measurement is prohibited in these applications. Fibre optic sensors however can be applied as they are less complex. Fibre optic accelerometers that have been investigated are however not capable of delivering the required resolution for monitoring the condition of the bearing.

The document U.S. Pat. No. 4,196,629 discloses a system for monitoring the operation of ball bearings in rotating machinery by continuously measuring the radial deflections of the outer race of these bearings using a fibre optic proximity probe.

Fibre optic strain sensors do have sufficient resolution and frequency bandwidth to assess the condition. The interpretation of the signals however is not as straight forward as using frequency analysis for bearing defects detection by acceleration measurement or by proximity probes, as the measurement of strain is very localised.

A method using Fiber Bragg Gratings (FBG) is disclosed in the article "Load Sensing and Condition Monitoring for a Subsea-multiphase pump" by P. J. Feenstra and N. S. W. den Haak in the Proceedings of the 1st DSPE conference on precision mechatronics—Sep. 4-5, 2012. The authors propose using enveloped strain signals for the purpose of defect detection. However, it has turned out the reliability of this bearing defects detection can still be improved.

SUMMARY OF THE INVENTION

The invention seeks to provide a bearing monitoring apparatus and a bearing monitoring method using strain signals which may be transmitted using fiber optic technologies, wherein the reliability of the bearing defects detection is improved.

The invention starts from a bearing monitoring apparatus including at least one interface for receiving strain signals detected by at least one strain sensor mounted on a bearing and at least one data processing unit configured to monitor the bearing by detecting bearing defects based on the strain signals. The data processing unit is configured to subject the strain signal to a high pass filtering, wherein a limit frequency of the high pass filter is set higher than a typical ball pass frequency of the bearing to be monitored, to calculate a quantity representative of the amplitude of the envelope signal of the high-pass filtered strain signal, to compare the peak hold of the envelope signal with an envelope threshold value, to classify the bearing using the result of the envelope comparison and to issue at least one warning signal if the bearing is classified as defective.

It is proposed that the data processing unit is further configured to determine at least one fluctuation signal representative of the fluctuation width of the high-pass filtered strain signal, to compare the fluctuation signal with a fluctuation threshold value, and to use the result of the fluctuation comparison in said classification of the bearing.

It has turned out that the information on high-frequency activities originating from defects in the raceway of the outer ring and/or from defects in the rollers can be best captured by detecting the fluctuation width in addition to the envelope signal.

The envelope threshold value and/or the fluctuation threshold value may be determined based on pertinent baseline values measured for good bearings.

Preferably, the data processing unit is further configured to increment a defect detection hit counter if the peak hold envelope signal exceeds the envelope threshold value within a predetermined time span, to increment said defect detection hit counter if the fluctuation signal exceeds the fluctuation threshold value within a predetermined time span, and to issue at least one warning signal if the defect detection hit counter exceeds at least one counter threshold value. While it is possible and in some applications advantageous to use different hit counters for the different threshold values in order to obtain a more detailed classification scheme, using a single hit counter for both kinds of signals greatly simplifies the matter.

It is further proposed that the quantity representative of the amplitude of the envelope signal data is a peak hold of the envelope signal, wherein the peak value is retained for a predetermined time corresponding to at least one rotation of a cage of the bearing to be monitored. Instead of the peak hold, a long-time weighted average (with decreasing weights for sample times in the past) of any suitable kind may be used.

According to a preferred embodiment of the invention, the fluctuation signal representative of the fluctuation width of the high-pass filtered strain signal is the result of the application of an RMS filter to the high-pass filtered strain signal. The RMS filter may be embodied as the square root of a one-pole lowpass processing (moving average) of the received data squared.

Preferably, the averaging time of the RMS filter is set to a value corresponding to at least multiple rotations of a cage of the bearing to be monitored in order to enable a reliable detection of effects even in cases where e.g. a defect on a roller hits the raceway in the proximity of the sensor only once in multiple roller passes. An averaging time of 2 seconds has turned out to be a reliable default value for a rotational speed of at least 100 rpm.

Preferably, this technology uses a combination of RMS high frequency strain and Peak hold of enveloped high frequency strain to arrive at overall levels that are combined using thresholding and binary logic to arrive at a conclusion regarding the condition of the bearing.

It is further proposed that the data processing unit is configured to compare the defect detection hit counter with multiple counter threshold values in order to classify a bearing defect status and to issue different warning signals as a function of the result of the classification.

Preferably, the envelope threshold value and/or the fluctuation threshold value are set so as to correspond to at least 1.3 times the levels obtained for normally operating bearings.

According to a further aspect of the invention, the data processing unit is configured to detect at least one out of the rotation speed and the load of the bearing to be monitored and to set at least one of envelope threshold value and the fluctuation threshold value as a function of the load and/or the speed. This can lead to further refinements of the detection precision and reliability.

A further aspect of the invention relates to a system comprising a bearing, a strain sensor mounted on the bearing and a bearing monitoring apparatus as described above receiving the signals of the strain sensor via the interface.

It is proposed that the strain sensor comprises a fiber Bragg grating (FBG) strain gauge in an optical fiber connected to the interface of the bearing monitoring apparatus.

Preferably, the fiber Bragg grating (FBG) strain gauge is mounted in a groove in an outer ring of the bearing.

In a preferred embodiment of the invention, the system comprises multiple strain sensors distributed over a circumference of the bearing with equal spacing or pitch angle.

The advantages of the invention are particularly fruitful in applications where the bearing is mounted in a deep sea water pump and the monitoring apparatus is located at or above sea level, wherein the sensor data are transmitted via at least one optical fiber such that sensitive electronic components at the deep-sea level are avoided and the robustness is increased.

A further aspect of the invention relates to a bearing monitoring method using strain signals detected by at least one strain sensor mounted on a bearing. The method comprises the steps of subjecting the strain signal to a high pass filtering, wherein a limit frequency of the high pass filter is set higher than a typical ball pass frequency of the bearing to be monitored, calculating a quantity representative of the amplitude of the envelope signal of the high-pass filtered strain signal, comparing the peak hold of the envelope signal with an envelope threshold value, classifying the bearing using the result of the envelope comparison, and issuing at least one warning signal if the bearing is classified as defective.

It is proposed that the method further comprises the steps of determining a fluctuation signal representative for the fluctuation width of the high-pass filtered strain signal, comparing the fluctuation signal with a fluctuation threshold value, and using the result of the fluctuation comparison in said classification of the bearing.

The technology provides the operator with an easier possibility to interpret the signal. As a consequence, a more detailed investigation can be conducted to arrive at a decision to take action regarding the asset that is being monitored.

The technology could be used on bearings with any kind rolling elements provided with strain measurement that is capable of detecting the strains caused by the individual rolling elements passing during rotation of the bearing.

The above embodiments of the invention as well as the appended claims and figures show multiple characterizing features of the invention in specific combinations. The skilled person will easily be able to consider further combinations or subcombinations of these features in order to adapt the invention as defined in the claims to his specific needs.

BRIEF DESCRIPTION OF THE FIGURES

FIG. 2 is a schematic illustration of a deep-sea pump with bearings monitored by the bearing monitoring apparatus according to the invention.

FIG. 3a is a schematic illustration of an outer ring of a bearing for use in a system according to the invention.

FIG. 3b is a sectional view of a sensor region in a groove in the outer ring of FIG. 3a.

DETAILED DESCRIPTION OF THE EMBODIMENTS

Figure 1:
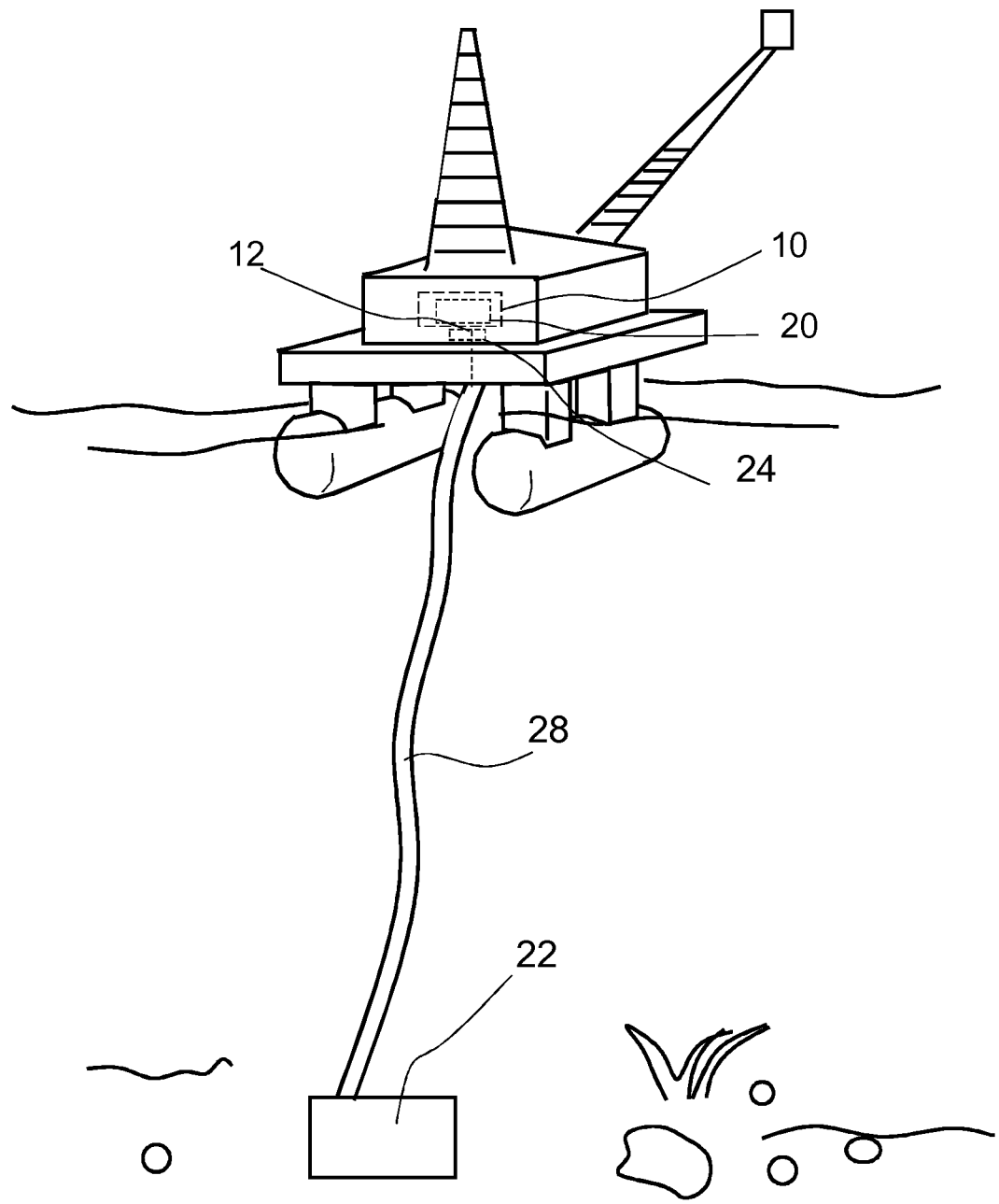
FIG. 1 is a schematic illustration of a system including a bearing monitoring apparatus and multiple bearings according to the invention.

FIG. 1 illustrates a system including a deep sea pump 22 with bearings 18 (FIG. 2) equipped with multiple sensors including strain sensors 14 and a bearing monitoring apparatus 10 located in a floating oil rig at sea level. The sensor signals are transmitted from the deep sea pump 22 to the bearing monitoring apparatus 10 by means of optical fibers 26 in a so-called umbilical 28 connecting the sea-level part of the system with the deep sea unit.

At the sea-level side, the fibers 26 are connected to a data acquisition unit 24 forming the core part of the interface 12. Optoelectronic units are provided in the data acquisition unit 24 that illuminate the sensor network and record the optical reflection (wavelength change) from each discrete sensor 14 and output them as strains and temperatures.

Stainless-steel tubes protect the fibers inside the pump 22. In the actual application, the optical fibers 26 are guided together with power supply lines and many control signals.

The pump 22 is formed as multiphase twin screw pump 22 as schematically illustrated in FIG. 2. A mixture of oil, water and gas enters the pump 22 at two inlets at both sides of the rotors. Subsequently, the flow passes through a chamber created with interlocking screws 30a, 30b that moves the mixture along the length of the screws to the outlet. The outlet is situated at the top of the pump 22. The pump 22 is designed for subsea operation, i.e., several km below sea level. Therefore high boost pressures and consequently high radial bearing loads are produced.

The bearing monitoring apparatus 10 installed in the sea level part of the system includes at least one interface 12 for receiving strain signals detected by the multiple strain sensor 14 mounted on the bearings 18 respectively. Further, the bearing monitoring apparatus 10 includes a data processing unit 20 configured to monitor the bearing 18 by detecting bearing defects based on the strain signals.

An outer ring 32 of the bearing 18 adapted to be used in combination with a bearing monitoring apparatus 10 is illustrated in FIG. 3a and FIG. 3b.

The outer ring 32 of the bearing 18 is provided with circumferential grooves 34a, 34b receiving glass fibers 26 provided with Fiber Bragg Gratings (FBG) equipping the bearings 18 with sensors 14. As illustrated in FIG. 3b, the optical fibers 26 are wound around the circumference of the bearing in the respective groove 34a, 34b. FBG sensors 18 are provided in both of the 2 lateral channels/grooves 34a, 34b of the bearing 18. The measuring length of each FBG strain sensor 14 set to 5 mm and the spacing of the sensors is equal to the circumferential distance between 2 rolling elements, in this case 37.9°. Though this is not illustrated in FIG. 3b, the glass fibres 26 may be guided from the outside into the grooves via a single lateral bore in the outer ring 32.

The middle sensor is placed at the top dead centre (TDC), which is marked on the side of the outer ring of the bearing 18 in order to facilitate the assembly in the correct orientation.

Further, a temperature sensor is placed at TDC in each raceway. The grooves 34a, 34b are sufficiently deep so that no component installed in the seat of the outer ring 32 in the channels/grooves 34a, 34b protrudes above the radially outer surface of the bearing 18. The components are therefore protected from damage.

The sensors 14 forming strain gauges and the temperature sensors are connected to the optical fiber 26, which is in turn connected to the interface 12 of the bearing monitoring apparatus 10.

Figure 4:
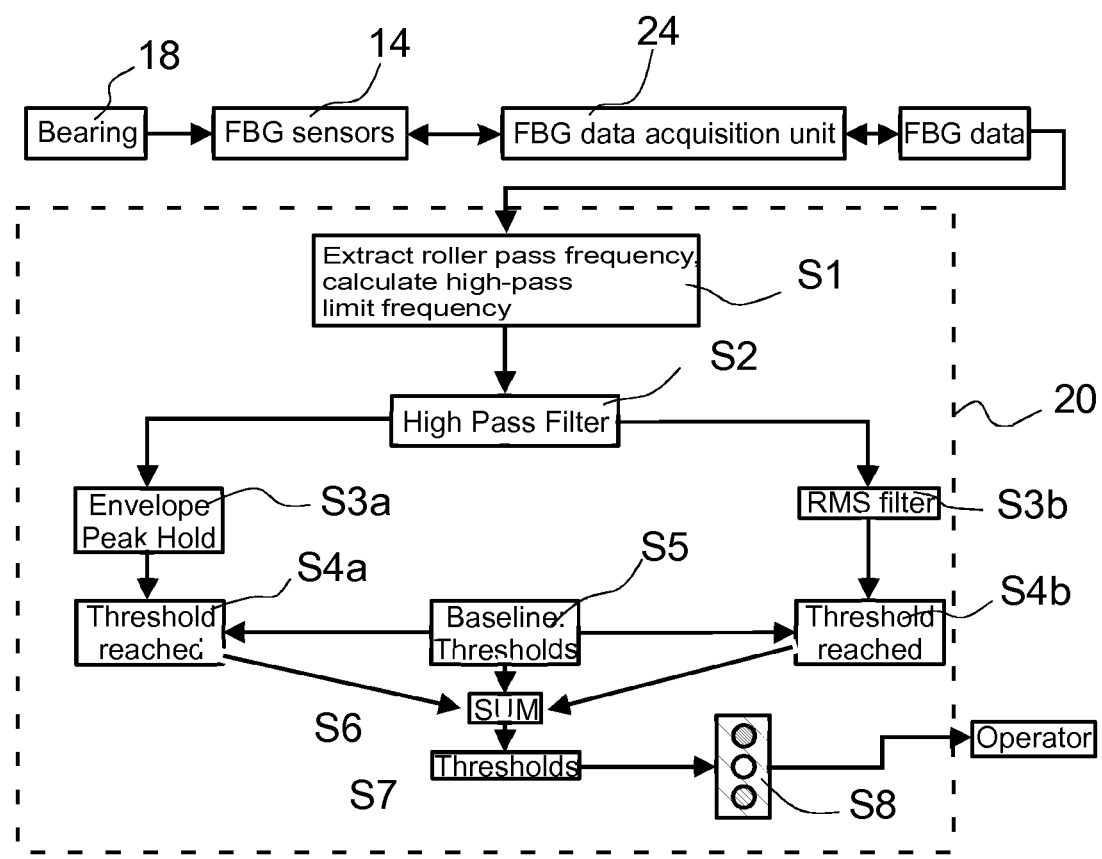
FIG. 4 is a flow diagram of a defect detection method implemented in the bearing monitoring apparatus according to the invention.

The data processing unit 20 is configured to execute a data processing as illustrated in FIG. 4.

In a step S1, a limit frequency of a subsequent high pass filter is set so as to be higher than a typical ball pass frequency of the bearing 18 to be monitored.

The limit frequency is a multiple of the roller pass frequency detected by the data processing unit 20. The roller pass frequency is the most prominent frequency peak in the spectrum of the strain signal, which is accompanied by a set of harmoics of the fundamental roller pass frequency. Therefore the cut-off frequency of the high pass filter is set far above the harmonics. The factor between the roller pass frequency and the limit frequency of the high pass filter depends on how many harmonics are significant in the specific application.

In general, at 20× the fundamental roller pass frequency, it is expected that no significant amount of basic roller pass signal is passed through.

In step S2, the signal is subjected to the high-pass filter with a limit frequency as determined in step S1. The high-pass filter may be a 4th order Butterworth filter.

After having passed the high-pass filter, the processing splits into two branches, e.g. by copying the signal. In a first branch illustrated on the left-hand side in FIG. 4, the data processing unit 20 calculates in step S3a a peak hold as a value representative of the amplitude of the envelope signal of the high-pass filtered strain signal. The peak hold of the envelope signal is then compared with an envelope threshold value in step S4a.

In the second branch, the data processing unit 20 applies in a step S3b a root-mean-square (RMS)-filter to determine a fluctuation signal representative for the fluctuation width of the high-pass filtered strain signal. The averaging time of the RMS filter is set to a value corresponding to at least one rotation of a cage of the bearing 18 to be monitored, e.g. to 2 seconds, which is determined based on the roller pass frequency extracted in step S1. Then, this fluctuation signal is compared in step S4b with a fluctuation threshold value. As described further below, the result of the fluctuation comparison will be used in a classification of the bearing 18.

In step S5, which might be combined with step S1, the data processing unit 20 calculates the threshold values to be used in steps S4a and S4b as a function of the load on the bearing and of the rotation speed. The data processing unit 20 reads the threshold values for the peak hold and for the fluctuation signal as a function of the load and/or of the speed from a storage unit or by using a predetermined characteristic. The rotation speed and the load of the bearing 18 to be monitored are calculated by the data processing unit 20 from a low-frequency part of the strain signal.

In step S6, if in steps S4a and S4b one either the fluctuation signal or the envelope signal exceeds the pertinent threshold within a predetermined time span amounting e.g. to 2 seconds, the data processing unit 20 increments a defect detection hit counter. The hit counter is automatically decremented or set to zero if no hits are detected in a certain period.

In step S7, the defect detection hit counter is then compared to several counter threshold values as described further below.

The above predetermined time spans are chosen such that a reliable detection for the most relevant kinds of defects is ensured. While for an outer ring defect, if the outer ring is instrumented with strain gauges, a holding time corresponding to one rotation of the cage is enough, this may not be sufficient for the reliable detection for the other inner ring and roller defects.

The detection of a defect relies on the alignment of the defect with the contact on inner or outer raceway and the sensor element, as the strain sensors 14 measure only very localized deformations. As the probability of the alignment decreases, the hold time needs to be longer.

In the embodiment illustrated, the data processing unit 20 employs two different counter threshold values and uses a warning signal with green, yellow and red light similar to a traffic light.

In step S8, if the value of the hit counter is below the first counter threshold value, the data processing unit 20 generates a signal corresponding to the green light indicating that everything is in good order and that the bearing 18 need not be replaced. If the value of the hit counter is greater or equal to the first counter threshold value and smaller than the second threshold value, the data processing unit 20 generates a signal corresponding to the yellow light indicating that there might be a defect and that a replacement of the bearing 18 is recommended, but not mandatory. If the value of the hit counter is greater or equal to the second counter threshold value, the data processing unit 20 generates a signal corresponding to the red lights indicating that there is a defect and that the bearing 18 is to be replaced. Depending on the field of application, the bearing monitoring apparatus 10 might trigger an emergency stop of the device or system using the bearing 18.

The above comparison of the hit counter is a classification the bearing 18 using the result of the envelope comparison and of the fluctuation comparison. The signals corresponding to the different colors of light are warning signals. The red light signalizes to the user that bearing 18 is classified as defective.

The invention claimed is:
1. A bearing monitoring apparatus comprising:
at least one interface for receiving strain signals detected by at least one strain sensor mounted in at least one circumferential groove in an outer ring of a bearing and at least one data processing unit configured to monitor the bearing by detecting bearing defects based on the strain signals, wherein the data processing unit is configured to: a subject the strain signal to a high pass filtering, wherein a limit frequency of the high pass filter is set higher than a typical ball pass frequency of the bearing to be monitored;
b. calculate a quantity representative of an amplitude of an envelope signal of the high-pass filtered strain signal;
c. compare the quantity representative of the amplitude of the envelope signal with an envelope threshold value;
d. classify the bearing using the result of the envelope comparison; and
e. issue at least one warning signal if the bearing is classified as defective; and wherein the data processing unit is further configured to:
f. determine at least one fluctuation signal representative for a fluctuation width of the high-pass filtered strain signal;
g. compare the at least one fluctuation signal with a fluctuation threshold value; and
h. use the result of the fluctuation comparison in said classification of the bearing.

2. The bearing monitoring apparatus according to claim 1, wherein the data processing unit is further configured to:
a. increment a defect detection hit counter if a peak hold of the envelope signal exceeds the envelope threshold value within a predetermined time span;
b. increment the defect detection hit counter if the at least one fluctuation signal exceeds the fluctuation threshold value within a predetermined time span; and
c. issue at least one warning signal if the defect detection hit counter exceeds at least one counter threshold value.

3. The bearing monitoring apparatus according to claim 1, wherein the quantity representative of the amplitude of the envelope signal data is a peak hold of the envelope signal, wherein a peak value is retained for a predetermined time corresponding to at least one rotation of a cage of the bearing to be monitored.

4. The bearing monitoring apparatus according to claim 1, wherein the at least one fluctuation signal representative for the fluctuation width of the high-pass filtered strain signal is the result of the application of an RMS filter to the high-pass filtered strain signal.

5. The bearing monitoring apparatus according to claim 4, wherein the averaging time of the RMS filter is set to a value corresponding to multiple rotations of a cage of the bearing to be monitored.

6. The bearing monitoring apparatus according to claim 1, wherein the data processing unit is further configured to compare a defect detection hit counter with multiple counter threshold values in order to classify a bearing defect status and to issue different warning signals as a function of the result of the classification.

7. The bearing monitoring apparatus according to claim 1, wherein at least one of the envelope threshold value and the fluctuation threshold value are set to correspond to at least 1.3 times the levels obtained for normally operating bearings.

8. The bearing monitoring apparatus according to claim 1, wherein the data processing unit is further configured to detect at least one out of the rotation speed and the load of the bearing to be monitored and to set at least one of the envelope threshold value and the fluctuation threshold value as a function of at least one of the load and the speed.

9. The bearing monitoring apparatus according to claim 1, wherein the at least one circumferential groove in the outer ring of the bearing comprises a first circumferential groove and a second circumferential groove that is lateral to the first circumferential groove.

10. The bearing monitoring apparatus according to claim 9, wherein each of the first and second circumferential grooves receive corresponding optical fibers wound around a circumference of the bearing.

11. The bearing monitoring apparatus according to claim 9, wherein the at least one strain sensor comprises a plurality of first sensors and a plurality of second sensors respectively housed in the first and second circumferential grooves.

12. The bearing monitoring apparatus according to claim 11, wherein a measuring length of each of the plurality of first sensors and the plurality of second sensors is 5 mm.

13. The bearing monitoring apparatus according to claim 11, wherein a spacing of the plurality of first sensors and the plurality of second sensors is a circumferential distance between the bearing and a rolling element.

14. A system comprising:
a bearing,
at least one strain sensor mounted in at least one circumferential groove in an outer ring of the bearing, and
a bearing monitoring apparatus having;
at least one interface for receiving strain signals detected by the at least one strain sensor and at least one data processing unit configured to monitor the bearing by detecting bearing defects based on the strain signals, wherein the data processing unit is configured to:
a. subject the strain signal to a high pass filtering, wherein a limit frequency of the high pass filter is set higher than a typical ball pass frequency of the bearing to be monitored;
b. calculate a quantity representative of an amplitude of an envelope signal of the high-pass filtered strain signal;
c. compare the quantity representative of the amplitude of the envelope signal with an envelope threshold value;
d. classify the bearing using the result of the envelope comparison; and
e. issue at least one warning signal if the bearing is classified as defective; and wherein the data processing unit is further configured to:
f. determine at least one fluctuation signal representative for a fluctuation width of the high-pass filtered strain signal;
g. compare the at least one fluctuation signal with a fluctuation threshold value; and
h. use the result of the fluctuation comparison in said classification of the bearing,
receiving the signals of the at least one strain sensor via the interface.

15. The system according to claim 14, wherein the at least one strain sensor further comprises a fiber Bragg grating (FBG) strain gauge in an optical fiber connected to the interface of the bearing monitoring apparatus.

16. The system according to claim 14, further comprising multiple strain sensors distributed over a circumference of the bearing.

17. The system according claim 14, wherein the bearing is mounted in a deep sea water pump and the monitoring apparatus is located at or above sea level, wherein the sensor data are transmitted via at least one optical fiber.

18. A method for monitoring a bearing using strain signals detected by at least one strain sensor mounted in at least one circumferential groove in an outer ring of a bearing, the method comprising the steps of:
a. subjecting the strain signal to a high pass filtering, wherein a limit frequency of the high pass filter is set higher than a typical ball pass frequency of the bearing to be monitored;
b. calculating a quantity representative of an amplitude of an envelope signal of the high-pass filtered strain signal;

c. comparing the quantity representative of the amplitude of the envelope signal with an envelope threshold value;
d. classifying the bearing using the result of the envelope comparison; and
e. issuing at least one warning signal if the bearing is classified as defective;
f. determining a fluctuation signal representative for a fluctuation width of the high-pass filtered strain signal;
g. comparing the fluctuation signal with a fluctuation threshold value; and
h. using the result of the fluctuation comparison in said classification of the bearing.

\* \* \* \* \*